United States Patent Office 3,836,628
Patented Sept. 17, 1974

3,836,628
CRYSTAL GROWTH MODIFIER
Joseph M. Ilardi, Kendall Park, and Eric Rau, Trenton, N.J., assignors to Intermountain Research and Development Corporation, Green River, Wyo.
Filed May 22, 1972, Ser. No. 255,417
Int. Cl. C01d 7/12, 7/40
U.S. Cl. 423—206  3 Claims

ABSTRACT OF THE DISCLOSURE

Soda ash is prepared from crude trona containing organic impurities by calcining the crude trona to crude soda ash at a temperature too low to remove the organics, preparing a clarified saturated aqueous sodium carbonate solution from the crude ash, and crystallizing sodium carbonate monohydrate from the solution without removing organics, by having present during the crystallization a small quantity—about 4 to 400 parts per million—of a mineral oil solution of a surfactant which is soluble in the mineral oil and not soluble in the sodium carbonate solution, but which lowers the surface tension between the oil and the carbonate solution.

---

Figure 1:
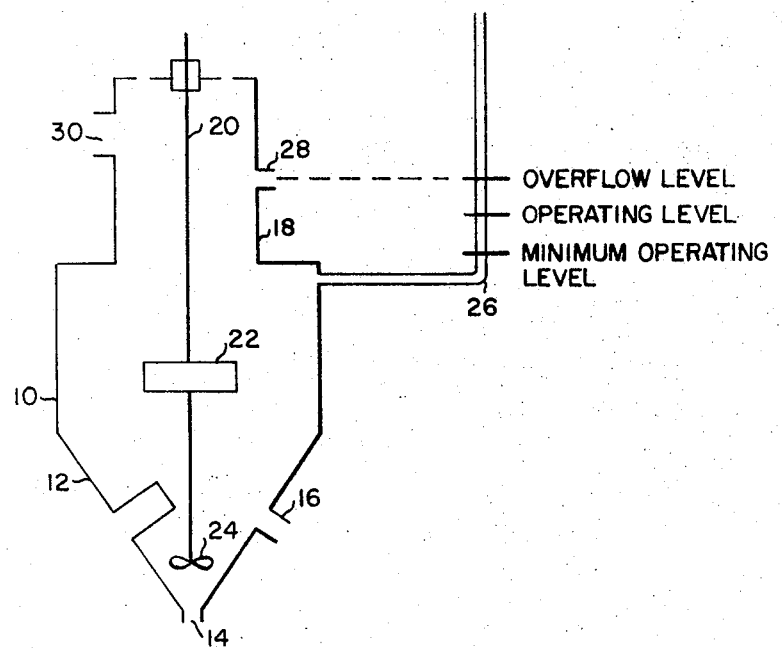

In the last two decades, the classic Solvay process for the preparation of soda ash—anhydrous sodium carbonate—has been challenged successfully by the exploitation of the beds of sodium sesquicarbonate (trona) which underlie a large area in southwestern Wyoming, Utah and Colorado. A similar deposit exists in Kenya. Substantially all the growth in soda ash capacity in the United States for this period has been in the utilization of this deposit.

Two basic processes have been used commercially in the processing of the ore, which typically contains, in addition to more than 90% of sodium sesquicarbonate, traces of sodium chloride, sodium sulfate and $Fe_2O_3$, several tenths of a percent of organic matter, and 5 to 15% of insolubles, largely silicates.

One process dissolves the sesquicarbonate as such, treats the solution to remove insolubles and organic matter, and then crystallizes sodium sesquicarbonate, which may be used as such or calcined to soda ash. The resultant soda ash is pseudomorphic in form after the crystal pattern of the sodium sesquicarbonate, and special additives are needed to get desirable crystal properties. Moreover, the crystal structure is different from that obtained by the conventional Solvay process, so that the product is sometimes difficult to substitute for conventional Solvay process soda ash.

The second basic process for handling natural trona produces a product which is like Solvay process ash. In this process, the trona is first calcined to crude soda ash; the ash is dissolved, and the solution treated to remove insolubles. The resultant solution is crystallized to produce sodium carbonate monohydrate crystals, which are then heated to remove the water of hydration and produce soda ash.

The organics present in the crude trona must be removed, or compensated for, if satisfactory crystals, which will produce ash of acceptable physical structure, are to be obtained in the crystallization—whether monohydrate, which is the product of commerce, or anhydrous soda ash, which can be produced in known fashion by the use of special crystallizing conditions (see U.S. Pat. 2,133,455, issued Oct. 18, 1938 and U.S. 3,425,795, issued Feb. 4, 1969). If the organics are not removed, poor crystals are produced, and the product occupies too large a volume, making it uneconomic to ship and handle. Additionally, foaming occurs in the crystallizer, complicating processing.

The standard method for removing organics is to use active carbon columns, through which the crude sodium carbonate solution is pumped; the organics are adsorbed by the carbon, resulting in a solution which will crystallize in desirable fashion. This method requires a substantial capital outlay for carbon-treating columns and pumps, and a continuous outlay for treating chemical, but it has been used in commercial installations for lack of a better method.

An alternate method is to calcine the crude trona at a temperature high enough to burn off the organics without fusing the crude trona. Such a process is described in Seglin et al., U.S. Pat. No. 2,962,348, issued Nov. 29, 1960. However, high calcination temperatures have not been used commercially because they induce a reaction between the sesquicarbonate and the insoluble silicates present in the ore, to produce sodium silicates which go into solution and contaminate the product. The amount of silica solubilized depends on the time and temperature of calcination. Even at minimum temperatures (about 375° C.) needed to burn off the organics, sufficient $SiO_2$ is solubilized to sodium silicate to be troublesome. As a result, this route has not met with commercial acceptance.

Tabler (U.S. Pat. No. 3,486,844, issued Dec. 30, 1969) utilizes this solubilized silica to improve crystal structure by adding guar gum, but this process does not appear to be commercial. Crystallization additives for the sesquicarbonate process are suggested in Bauer et al. U.S. Pat. No. 2,954,282, issued Sept. 27, 1960 (anionic surfactants) and in Herink et al. U.S. Pat. No. 3,248,182, issued Apr. 26, 1966 (anionic surfactants mixed with mineral oil).

It is the object of this invention to produce soda ash from trona by the precalcination process without the necessity for expensive carbon treatment to remove organics, at low cost.

We have discovered that this object can be attained by omitting the carbon treatment step in the standard process for making soda ash in which crude Wyoming trona is first calcined, and instead crystallizing with certain specific additives. In accordance with this invention, we calcine crude trona at a temperature too low to deactivate the organics present, prepare a clarified saturated aqueous sodium carbonate solution containing the organics, and—without removing organics—crystallize sodium carbonate monohydrate crystals in the presence of about 4 to 400 parts per million (p.p.m.) of a mineral oil solution of a surfactant soluble in the mineral oil and not soluble in the sodium carbonate solution and which lowers the surface tension between the oil and water, using 1 part by weight of surfactant to from 1 to 20 parts by weight of mineral oil.

Figure 2:
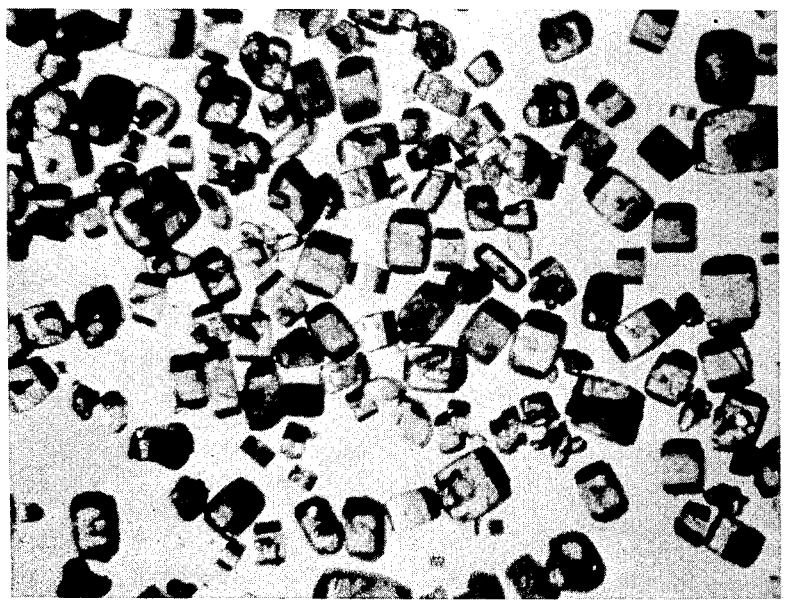

In the drawings,
FIG. 1 is a schematic diagram of a continuous laboratory crystallizer used to exemplify the invention.
FIG. 2 is a photomicrograph, at 15 times magnification, of a typical product.

This invention is an improvement in the processing of Wyoming, Utah and Colorado trona in which the crude trona, containing organic impurities, is calcined at a relatively low temperature (under about 350° C.) to convert the sodium sesquicarbonate in the trona to sodium carbonate, leaving organic impurities in sufficient concentration to be troublesome. The crude trona ash is made into a concentrated solution, which is clarified and then crystallized. In the prior-art commercial processes, the organic impurities are adsorbed onto active carbon before the solution is crystallized. This invention aims to eliminate the necessity of carbon treatment by adding to this clarified concentrated sodium carbonate solution reagents which counteract the effect of the organic impurities, so that crystallization can be carried out without prior carbon treatment.

The additive we employ is a solution in mineral oil of a surfactant which lowers the surface tension between the oil and the sodium carbonate solution but is not soluble in the sodium carbonate solution, in a concentration of about 4 to 400 p.p.m. of solution, using 1 part by weight of surfactant to about 1 to 20 parts by weight of mineral oil. Preferably, we employ at least 10 p.p.m. of the mineral oil solution.

A preferred class of surfactants comprises diesters of a polyethylene or polypropylene glycol, in which the hydroxyls are esterified with a long-chain fatty acid containing at least 12 carbon atoms (lauric acid or higher). The cheapest fatty acids such as oleic, stearic and mixed acids of commerce do very well indeed. The polyglycol should have a molecular weight so that the resultant ester has good surfactant properties and is generally between 500 and 50,000; preferably the molecular weight is in the range of about 1,000 to 5,000.

Other satisfactory mineral oil-soluble surfactants include soaps of higher fatty acids and metals other than the alkali metals—e.g. calcium stearate, barium oleate—and higher fatty acid amides such as oleyl and stearyl amides.

The mineral oil used can be any mineral oil which is sufficiently nonvolatile so that it is not rapidly distilled off in the evaporation. Diesel oil, fuel oil, and similar cheap, relatively nonvolatile mineral oils are satisfactory.

About 4 p.p.m. of the mixture, based on sodium carbonate solution, is needed to control crystallization. Above about 400 p.p.m., excessive crystal degradation can occur.

Mineral oil alone, without surfactant, will work only if the crystallizers are operated at rates substantially below normal. The surfactant apparently acts to permit the oil to spread over the aqueous surface at the higher agitation rates necessary for normal crystallization operations.

In the drawings, FIG. 1 illustrates a laboratory crystallizer for testing the invention. The crystallizer consists of a main cylindrical section 10, a conical bottom section 12, and a smaller cylindrical top section 18. A drain 14 at the bottom of the crystallizer serves to clean out the device; a slurry discharge 16 for removing the required amount of slurry. A stirrer 20 is used to keep the material agitated; it has a turbine blade 22 in the section 10 and a propeller 24 at its bottom in the section 12. An overflow 28 is provided in the section 18 to assure a maximum operating level in the device; the minimum operating level is the top of the section 10. The device has a volume of 300 ml. below the slurry discharge 16, 3,575 ml. between that point and the top of the section 10, and 500 ml. in section 18 below the discharge level 28. An inlet 26 is provided to indicate crystallizer level and an outlet 30 is provided for removing water vapor to a condenser not shown on the drawing.

EXAMPLES OF THE INVENTION

Example 1

A typical sample of natural Wyoming trona ore was calcined to crude soda ash in a fluid-bed reactor at 175° C. The resultant crude ash contained 12% of water-insolubles. Enough of the calcined ore was dissolved into distilled water to give, after filtration, 26.5 kilos of a clear yellow-colored 30% $Na_2CO_3$ solution which analyzed at 80 p.p.m. of carbon.

Four thousand one hundred milliliters of the 30% $Na_2CO_3$ solution was placed into the laboratory crystallizer shown in FIG. 1 and $H_2O$ was evaporated at atmospheric pressure and 104.8° C. until a monohydrate crystal slurry of 32 weight percent was built in the crystallizer. In the process of attempting to build the initial slurry in the crystallizer, however, excessive flashing, and foaming through the condenser, became such a problem that the unit had to be shut down. At this point, 100 mg. of a 50-50 weight percent diesel oil-polyethylene glycol dioleate (MW of polyethylene glycol=1,500) mixture was added into the 26.5 kilos of solution. After the addition, crystallizer foaming was under control and the slurry was built to 32%. A constant level was maintained in the crystallizer as the slurry was being built by adding fresh 30% feed from the original 26.5 kilo stock solution. The unit was now placed under continuous closed-loop operation with a reconstitution of 100 ml. of $H_2O$ condensate to 113 ml. of slurry discharge increments every 7 minutes to give a feed (equivalent in composition to the 26.5 kilos) which was then fed back continuously into the crystallizer to maintain the 4,100 ml. volume level. Under these conditions of evaporation (14 ml. per minute of $H_2O$) and slurry discharge, the residence time in the unit was calculated to be 4.3 hours. Every 2 hours, a slurry sample was taken and the crystals analyzed (the crystallizer level being maintained, using fresh feed from the 26.5 kilos) for shape, particle size distribution and bulk density.

The crystals grown in the crystallizer using un-carbon-treated feed with the surfactant-diesel oil mixture to act as a defoaming and crystal growth modifying agent were excellent. The average bulk density of the ten products taken was 65 pounds per cubic foot as anhydrous $Na_2CO_3$. The particle size distribution (Table 1 below) showed less than 7% as −100 mesh, with most crystals having the typical desired isometric shape (see FIG. 2 of the drawings). Thus from an un-carbon-treated feed liquor we were able to grow an $Na_2CO_3$ monohydrate crop of crystals (and consequently a high bulk density ash) with the aid of the crystal growth modifier and defoaming agent. It should be noted that, to the initial 100 mg. of mineral oil-surfactant solution, 250 mg. more had to be used, in two separate 125 mg. batches, so as to quell subsequent foaming during the 3-day run, i.e., a total of about 13 p.p.m. of additive, with about 4 p.p.m. controlling the crystallization initially.

TABLE 1

Average Product Particle Size

| | Percent |
|---|---|
| +20 | 0.4 |
| +30 | 3.4 |
| +40 | 24.6 |
| +50 | 59.4 |
| +70 | 82.7 |
| +100 | 93.1 |

Examples 2, 3 and 4

Preliminary screening experiments were run on the other surfactants, using:

Example 2—a commercial detergent, largely oleyl amide;

Example 3—a commercial detergent, largely stearyl amide;

Example 4—a commercial detergent based on calcium stearate.

In each case, 150 cc. of 30% sodium carbonate solution, obtained by dissolving crude trona calcined at 225° C., was filtered; the solution was kept at 50° C. with nitrogen at a flow rate of 1.5 s.c.f. per hour to supply a stable head of foam. Into each sample there was then introduced 20 p.p.m. of a 50–50 weight solution of the indicated surfactant in mineral oil. The following results were obtained.

| | Original foam height, mm. | Foam height after addition, mm. |
|---|---|---|
| Example 2 | 242 | 25 |
| Example 3 | 230 | 10 |
| Example 4 | 199 | <2 |

Crystallization runs similar to Example 1, made with the surfactants of Examples 2, 3 and 4, gave good crystals despite the absence of the carbon treatment heretofore considered essential.

Obviously, the examples can be multiplied without departing from the spirit of the invention as defined in the claims.

Pursuant to the requirements of the present statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the method in which crude trona containing organic impurities is calcined at a temperature high enough to convert the trona to crude soda ash but too low to burn off the organics, the crude soda ash is dissolved in water and the solution separated from insolubles, and the resultant solution is crystallized to produce sodium carbonate monohydrate crystals, the improvement which comprises crystallizing sodium carbonate monohydrate from the solution containing the organic impurities without previously treating the solution to reduce the level of organics, controlling the crystallization by adding to the solution from 4 to 400 parts per million of a solution in mineral oil of a nonionic surfactant soluble in the mineral oil and insoluble in the sodium carbonate solution being crystallized, the surfactant reducing the surface tension between the mineral oil and the sodium carbonate solution and being present in a weight ratio to the mineral oil of from 1:1 to 1:20.

2. The method of claim 1, in which the surfactant is a diester of a fatty acid of chain length of at least 12 and a polyglycol of molecular weight between 500 and 50,000.

3. The method of claim 1, in which the surfactant is selected from the group consisting of (A) a diester of polyethylene having a molecular weight between 500 and 50,000 with a long-chain fatty acid containing at least 12 carbon atoms; (B) a diester of polypropylene glycol having a molecular weight between 500 and 50,000 with a long-chain fatty acid containing at least 12 carbon atoms; and (C) higher fatty acid amides.

References Cited
UNITED STATES PATENTS

| | | | |
|---|---|---|---|
| 3,248,182 | 4/1966 | Herink et al. | 23—300 |
| 3,528,766 | 9/1970 | Coglaiti et al. | 423—427 X |
| 3,725,014 | 4/1973 | Poncha | 423—421 |
| 2,372,402 | 3/1945 | Stokes et al. | 423—421 X |

OSCAR R. VERTIZ, Primary Examiner

B. E. HEARN, Assistant Examiner

U.S. Cl. X.R.

23—300, 302; 423—266, 268, 421